(No Model.)  2 Sheets—Sheet 1.
A. L. HINCHMAN.
STOCK HITCHING DEVICE.
No. 443,964. Patented Dec. 30, 1890.
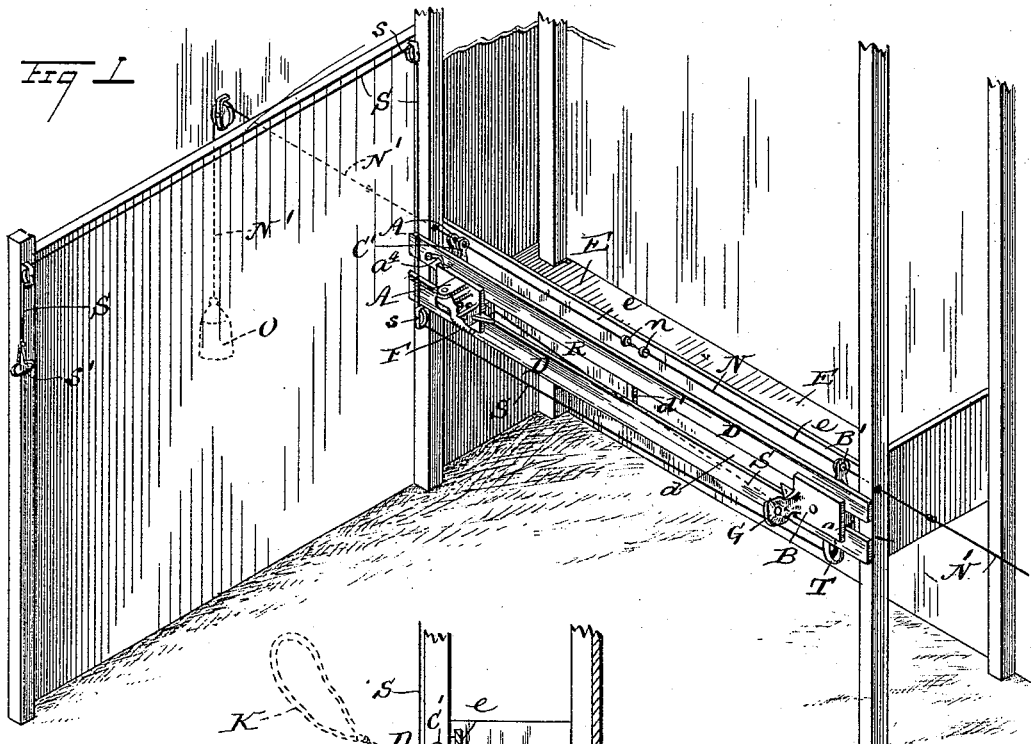
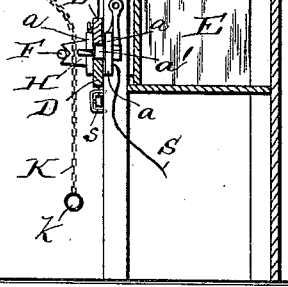
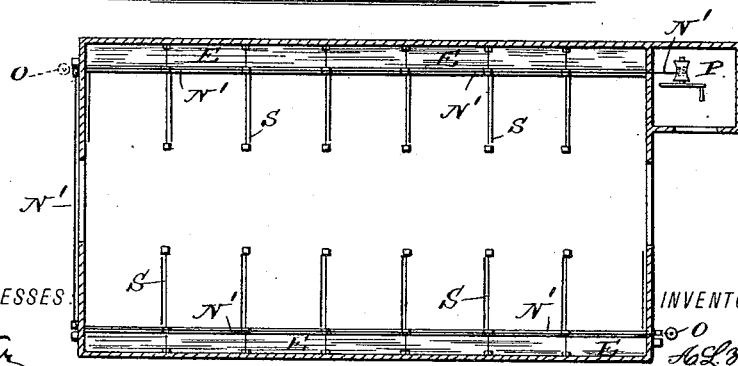
WITNESSES
H. Walker
E. M. Clark
INVENTOR:
A. L. Hinchman
BY
Munn & Co.
ATTORNEYS

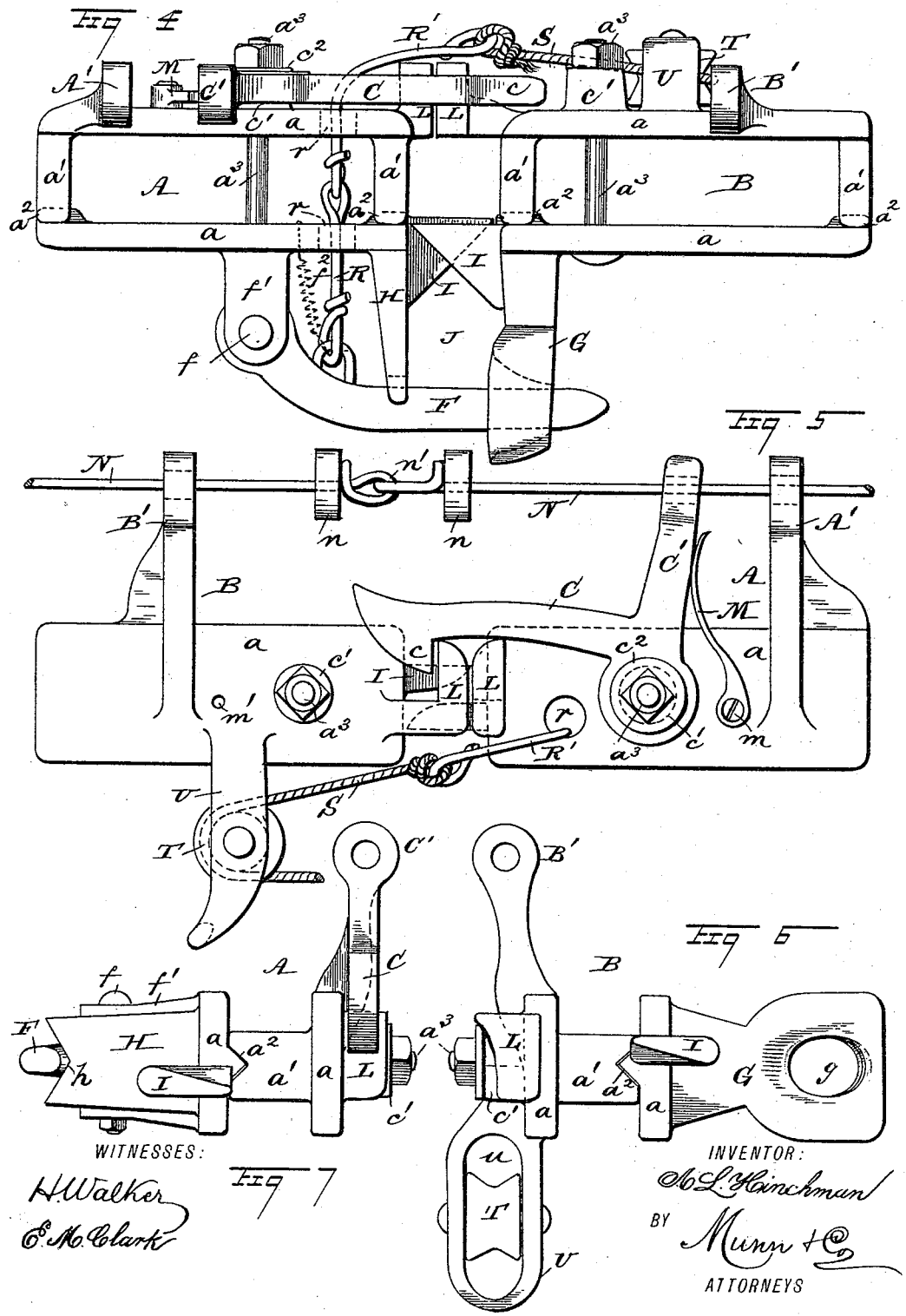

UNITED STATES PATENT OFFICE.

ANDREW L. HINCHMAN, OF LOWELL, WEST VIRGINIA.

STOCK-HITCHING DEVICE.

SPECIFICATION forming part of Letters Patent No. 443,964, dated December 30, 1890.

Application filed July 18, 1890. Serial No. 359,134. (No model.)

*To all whom it may concern:*

Be it known that I, ANDREW L. HINCHMAN, of Lowell, in the county of Summers and State of West Virginia, have invented a new and Improved Stock-Hitching Apparatus, of which the following is a full, clear, and exact description.

My invention relates to a hitching apparatus or tie for horses, cows, or other animals, and has for its object to provide a simple, inexpensive, and efficient apparatus of this class which will admit of securely hitching an animal and quickly unhitching him without requiring the operator to enter the stall beside him, thus insuring safety of the attendant against fractious animals and facilitating escape of animals in case of fire.

The invention provides, also, for unhitching any number of animals simultaneously from either one or both sides of a building.

The invention will first be described, and then will be particularly pointed out in claims hereinafter set forth.

Reference is to be had to the accompanying drawings, forming a part of this specification, in which similar letters of reference indicate corresponding parts in all the figures.

Figure 1 is a perspective view of a manger and stall, showing my improved halter-retaining or clutch blocks applied to the manger and the pull cords or ropes adapted to hitch and unhitch an animal. Fig. 2 is a vertical transverse section of the manger and an end view of one of the hitching or clutch blocks.
Fig. 3 is a diagrammatic plan view showing the arrangement of pull-cords for operating a number of the hitching devices simultaneously. Fig. 4 is a much enlarged plan view of the two hitching or clutch blocks as they appear when latched together for hitching an animal, the unhitching pull wire or cord being removed. Fig. 5 is a rear view of the two latched blocks with the hitching and unhitching wires or cords attached. Fig. 6 is a front end view of one of the hitching or clutch blocks, and Fig. 7 is a like view of the other block.

I will first particularly describe the two hitching or halter-clutch blocks of the apparatus, with more special reference to Figs. 4, 5, 6, and 7 of the drawings, and I will then explain the arrangement of the pull wires or cords for operating the clutch-blocks to hitch and unhitch one or more animals at their stalls.

The two clutch-blocks A B and the hook-latch C for locking them together are made of metal and preferably in the forms shown in the drawings. As these blocks are both more especially intended to slide upon and between the adjacent edges of two guide-strips D D, fixed at the outer face of a manger E, from which an animal is to feed, I make the body portions of the blocks in two halves or with opposite face plates or pieces $a\,a$, one of which is provided with lugs $a'\,a'$, projecting toward and preferably locked to the other by a tongue-and-groove end joint $a^2$. These lugs $a'$ are of proper length to separate the wider face-plates $a\,a$ sufficiently to allow them to slide along opposite faces of the manger guide-strips D D, and the lugs are made narrow to fit easily in the space $d$ between said guides. The blocks are both retained in place on the guides after they are applied from opposite faces thereof by a bolt $a^3$, which preferably passes through a round boss $c'$, provided on the rear face of the inner face-plate $a$ to receive and form a fulcrum or pivot for the hook-latch C, to be hereinafter more fully explained.

The guides D D are preferably nailed onto the uprights which support the manger, which gives clearance for the clutch-blocks to allow them to slide along outside the front board $e$ of the manger, this board serving as a guard to prevent the hay or feed of the animal from choking up the blocks or interfering with their free sliding movements toward and from each other.

One of the clutch-blocks, preferably the one A, is provided with a longitudinal pin F, which is adapted to enter an eye or hole $g$, formed in a lug G projecting from the other clutch-block. This pin F may be rigid on the block A; but I prefer to hinge it thereto by a pin $f$, entering lugs $f'$ on the outer face-plate $a$ of the block, and provide a stop-lug or projection H on the face-plate for the pin to strike when in proper position to enter the eye G of the opposing block B. The end of the stop-lug H is preferably concaved to receive the pin F and prevent undue vertical play of said pin. On the opposing ends of the two clutch-blocks A B are formed a couple of lugs I I, one on each block and in planes one above the other, so that they overlap when the blocks are drawn together. The front edges of these lugs I I are preferably beveled rearward. When the two clutch-blocks are latched together, the opening J, formed between the pin F and the lugs G, H, and I, receives the chain or rope halter K, (shown in dotted lines in Fig. 2,) and having a ring $k$ at its free end, which will not slip through said opening.

At its rear or inner face each of the clutch-blocks A B is provided with a catch-lug L, with which the hook-latch C is adapted to engage. By providing each of the blocks with a round boss $c'$ the eye of the hook-latch C may be adjusted on the boss of either block, and the hook $c$ of the latch will then engage the catch-lug L of the other block when the two blocks come together. Any suitable spring may be provided to hold the latch-hook behind the catch-lug. I show for this purpose an ordinary plate-spring M, and hold it to one of the clutch-blocks by a screw $m$, which may be screwed into a hole $m'$ in the other block when the hook-latch and spring are transferred thereto. A washer $c^2$ is preferably used under the head of the bolt $a^3$, which holds the hook-latch to the block. The hook-latch C is provided with an upwardly-extending arm $C'$, which has a hole or eye at its outer end and in line with like eyes formed at the extremities of arms $A'$ $B'$, projecting upward from the clutch-blocks A B, respectively. A wire N is passed freely through these eyes or openings of the arms $A'$ $B'$ $C'$, and at opposite ends is connected to pull cords or ropes $N'$ $N'$, to one of which is hung a weight O, while the other cord may be connected to a windlass P, as in Fig. 3 of the drawings, or may have any suitable stop or handle pin or block at one side of the stall or building. On the wire N is fixed a button, which may be one piece of metal or wood, but is shown as formed of two metal parts $n$ $n$, one at each side of a looped joint $n'$ of the wire. (See Fig. 5 of the drawings.) This wire N, when drawn endwise in opposite directions, unlatches the halter clutch-blocks and draws the blocks one to each end of the manger, as hereinafter more fully explained.

When the pin F is hinged to the clutch-block A, I may draw it to normal position into the concaved end $h$ of the lug H by a suitable spring—a spiral spring $f^2$, for instance, (shown in dotted lines in Fig. 4 of the drawings;) but I prefer to connect to the inner face of the hinged pin F, or to a loop or eye thereon, a wire link R, to which a like bent link $R'$ is attached, said links passing through holes $r$ $r$ made in the face-plates $a$ $a$ of the clutch-block A. To the second link $R'$ is attached one end of a pull-cord S, which passes to and over a pulley T, journaled in an eye or aperture $u$ in a pendent arm U, fixed to the other clutch-block B, and the cord thence is returned toward the block A, and is run over suitable guide-pulleys $s$, which conduct it to the rear of the stall, where it preferably has a handle $s'$, by pulling which the blocks A B will be drawn together and latched at the center of the manger-front, where a pin or stop $d'$ is provided across the slot $d$ between the clutch-block guides D D, in order to stop one block at the pin until the other block latches to it.

The operation of my invention is very simple and effective. We will suppose that the two clutch-blocks had been drawn to the opposite ends of the manger, as shown in Fig. 1 of the drawings, and the button $n$ $n$ of the wire N stands at its normal position, which is at the center of the manger above the stop $d'$ thereon. When a horse, cow, or other animal enters the stall with the bight of the halter K on his head or neck and the free end of the halter hanging with the end ring $k$ about level with or a little below his knees, it is manifest that as the animal walks up to the manger to feed therefrom the halter will hang across the manger front anywhere between the two clutch-blocks A B. If now the cord S be pulled by its handle $s'$ at a safe distance behind the animal, the clutch-blocks A B will be drawn toward each other, and after one block strikes the stop $d'$ the other block will meet it, and after the pin F, which had been drawn snugly to the lug H by the pull of the cord S, enters the eye $g$ of the other clutch-block the hook C on one block will engage the catch-lug L on the other block to lock both blocks together. As the blocks approached each other, the inclined front faces of the lugs I I thereon assured the passage of the halter chain or rope into the opening J between the lugs and the pin F, and when the blocks are latched together the halter will be held between them in said opening J, but cannot be pulled from the blocks, as the end ring or stop $k$ of the halter will not pass through this opening. Hence the animal will be securely but comfortably hitched to the manger. To unhitch the animal it is only necessary to slack off one end of the rope $N'$ by the windlass or otherwise and allow the weight O to draw the other cord $N'$ and the button $n$ on the connected wire N first against the arm $C'$ of the hook-latch C to unlock the blocks and then to draw the block A over to free the halter and then along to one end of the manger, where said block will be caught and detained by a suitable spring-catch $a^4$ on one of the guides D. The wire N will now be drawn by the windlass in the other direction as it slips through the eye in the lug $A'$ of the detained block A and until the button $n$ strikes the arm $B'$ of the other block B, yet standing at the center of the manger and draws this block to the other end of the manger, whereupon the wire N will be drawn back again by the weight O, as permitted by the windlass P and until the button $n$ again stands at the center of the manger, where it will be held by the weight, so as not to interfere with the next mutual inward movement of the clutch-blocks for again hitching an animal in the manner above described.

Fig. 3 of the drawings shows how one continuous pull rope or cord N' may extend from the windlass P along the mangers E, running along one side of a barn or building, and has suitably interposed button-carrying wires, and is carried by suitable pulleys across one end of it above the doorway, and thence along the other side of the building at another series of mangers E and out at the same end of the building, where a weight O is hung to the cord. Each stall at both sides of the building is fitted with the pull-cord S, which draws the two clutch-blocks together in the stall for hitching each animal separately. In this arrangement of the hitching devices the hook-latches C at one side of the building will be pivoted to the bosses h of the blocks A, and the latches at the other side of the building will be pivoted to the bosses h of the blocks B, so that the oppositely-running sides of the cord N' and the wires and buttons n thereon will simultaneously unlatch the clutch-blocks in all the stalls at both sides of the building. If desired, the hitching-blocks at one side only of a building may be unlatched simultaneously, and in this case the weight O will be connected to the cord N' at that side and directly opposite the windlass P at the other end of the building, the weight in this instance being indicated by dotted lines at the left-hand end of Fig. 3 of the drawings. Any other approved devices may be substituted for the windlass and weight P O, such as plain handles or knotted ends of the pull-cords. The single cord S may also be substituted by two cords, forming an operative equivalent, and connected one to each clutch-block A B, to be drawn upon from opposite directions to pull the blocks together for hitching an animal; but the single cord is preferred, as it pulls both blocks together when operated at one place behind the animal and at less risk to the attendant.

I consider that the arrangement of the two clutch-blocks to slide one from each side of the manger toward each other is an important feature of my invention, because by this construction the animal is always hitched to the center of the manger irrespective of the position he takes at the front of the manger when he first enters the stall, as his halter may hang down the front of the manger at any place between the two widely-separated clutch-blocks and be caught and hitched as the blocks are pulled together and without requiring the attendant to enter the stall beside the animal. Furthermore, a desirable comparatively short halter may be used to hitch the animal while allowing him to reach comfortably to opposite ends of the manger or the rack above it, and also obviating dangers from entanglement by the halter and preventing too great backward movement of the animal in the stall, as will readily be understood.

Having thus described my invention, what I claim as new, and desire to secure by Letters Patent, is—

1. A stock-hitching apparatus comprising a guide, two independent clutch-blocks thereon movable bodily toward and from each other and provided with retainers for a halter, and a cord or cords connected to the blocks for drawing them together, substantially as described.

2. A stock-hitching apparatus comprising guides, two movable clutch-blocks thereon provided with retainers for a halter, and a pull-cord connected to one block and rove through a guide on the other block, substantially as described.

3. A stock-hitching apparatus comprising a guide, two independent clutch-blocks thereon movable bodily toward and from each other, a latch on one block adapted to engage the other block, and a cord or cords connected to the blocks for pulling them together to retain the halter, substantially as described.

4. A stock-hitching apparatus comprising guides, two movable clutch-blocks thereon provided with retainers for a halter, and a wire or cord guided on the blocks and provided with a button, substantially as described, whereby on pulling the wire in opposite directions the blocks will be moved apart and to opposite sides, as set forth.

5. A stock-hitching apparatus comprising guides, two movable clutch-blocks thereon provided with retainers for a halter, a latch on one block adapted to engage the other block, and a wire or cord guided on the blocks and provided with a button, substantially as described, whereby on pulling the wire in one direction the blocks will be unlatched and one block will be drawn to one side and on pulling the wire in the other direction the other block will be drawn to the other side, as set forth.

6. A stock-hitching apparatus comprising guides, two movable clutch-blocks thereon provided with retainers for a halter, each block having a catch-lug, combined with a transferable latch adapted to either block and to engage the catch of the opposite block, and a cord having a button and guided on both blocks and adapted when pulled to unlatch the blocks and subsequently draw them apart, substantially as described.

7. A stock-hitching apparatus comprising guides, two movable clutch-blocks thereon adapted to latch together and provided with retainers for a halter, and a cord or cords connected to the blocks for pulling them together to engage the halter, said blocks also provided with guides, and a wire or cord therein having a button and adapted when pulled in opposite directions to unlatch the blocks and draw them apart to opposite sides, substantially as described.

8. A stock-hitching apparatus comprising guides, two movable clutch-blocks thereon, one block provided with a hinged halter-retainer and a stop therefor and the other block having an eye receiving said retainer, and a pull-cord connected to the hinged retainer on one block and rove through a guide on the other block, substantially as described, whereby the hinged retainer will be drawn to proper position to engage the eye of the opposite block before both blocks are drawn together by the cord, as herein set forth.

9. In stock-hitching apparatus, the combination, with guides, two sliding clutch-blocks thereon provided with retainers for a halter, and a pull-cord connected to the blocks for drawing them together, of a central stop on the guides, substantially as described.

10. In stock-hitching apparatus, the combination, with guides, two sliding clutch-blocks thereon having retainers for a halter, a pull-wire guided on the blocks and having a button adapted to draw the blocks apart and to opposite sides, and a detent for one block at one side while the wire is being drawn through it to slide the other block to the other side, substantially as described.

11. In stock-hitching apparatus, the two sliding clutch-blocks made with opposing lugs I I, lugs H G, and a halter-retaining pin adapted to enter the lug G, substantially as described.

12. In stock-hitching apparatus, the two sliding clutch-blocks, one made with an apertured lug G and the other with a hinged pin F, adapted to enter said lug, and a stop H for the pin, each block having a lug I, substantially as described.

13. In stock-hitching apparatus, the two sliding clutch-blocks, one made with an apertured lug G and the other made with a stop-lug H, and a hinged halter-retaining pin F, combined with a pull-connection R S, attached to the pin and guided in both blocks, substantially as described.

14. In stock-hitching apparatus, the combination, with guides, of two sliding clutch-blocks thereon having apertured lugs A' B' and catch-lugs L L, a latch C on one block adapted to engage the other block and having an apertured lug C', and a wire N, passed through the lugs A' B' C' and provided with a button, substantially as described.

15. In stock-hitching apparatus, the combination, with guides, two sliding clutch-blocks thereon having retainers for a halter, a pull-wire guided on the blocks and having a button adapted to draw them apart, a weight connected at one end of the pull-wire, and a windlass or handle at the other end of the wire, substantially as described.

ANDREW L. HINCHMAN.

Witnesses:
J. B. HEDRICK,
R. T. MAIN.